United States Patent
Wang

(10) Patent No.: US 7,331,620 B2
(45) Date of Patent: Feb. 19, 2008

(54) SHOVEL CAPABLE OF FACILITATING THE OPERATION OF THROWING SHOVELED OBJECTS OFF

(76) Inventor: Kuang Pin Wang, No. 425, Ta-Tun 4th Street, Taichung (TW)

( * ) Notice: Subject to any disclaimer, the term of this patent is extended or adjusted under 35 U.S.C. 154(b) by 0 days.

(21) Appl. No.: 10/834,213

(22) Filed: Apr. 29, 2004

(65) Prior Publication Data

US 2005/0242598 A1 Nov. 3, 2005

(51) Int. Cl.
*B25G 1/04* (2006.01)
(52) U.S. Cl. .................. 294/58; 294/57; 403/379.5
(58) Field of Classification Search .............. 294/19.1, 294/54.5, 57, 58; 16/426, 429; 15/144.4; 403/377, 379.5
See application file for complete search history.

(56) References Cited

U.S. PATENT DOCUMENTS

| | | | |
|---|---|---|---|
| 1,374,061 A * | 4/1921 | Bertram | 294/58 |
| 5,133,582 A * | 7/1992 | Rocha | 294/58 |
| 5,447,349 A * | 9/1995 | Coble | 294/58 |
| 5,487,577 A * | 1/1996 | Ball | 294/58 |
| 5,921,600 A * | 7/1999 | Lucas | 294/58 |
| 6,062,619 A * | 5/2000 | Clark, Jr. | 294/58 |
| 6,283,522 B1 * | 9/2001 | Renaud | 294/58 |

* cited by examiner

*Primary Examiner*—Dean J. Kramer
(74) *Attorney, Agent, or Firm*—Rosenberg, Klein & Lee

(57) ABSTRACT

A shovel has a main handle, a blade member, a pivot base and an auxiliary handle. The blade member is mounted at an end of the main handle, the pivot base is pivoted on the main handle adjacent to the blade member and the auxiliary handle is pivoted on the pivot member. The main handle is rotatable independently relative to the pivot base. A user operates the shovel of the present invention by holding the main handle and the auxiliary handle and need only to turn the hand holding the main handle to tip the blade member for throwing the shoveled objects off.

2 Claims, 5 Drawing Sheets

SHOVEL CAPABLE OF FACILITATING THE OPERATION OF THROWING SHOVELED OBJECTS OFF

BACKGROUND OF THE INVENTION

1. Field of the Invention

The present invention relates generally to a hand tool, and more particularly to a shovel, which an auxiliary handle is pivoted thereon for facility of throwing the shoveled object off.

2. Description of the Related Art

FIG. 6 shows a conventional shovel having a main handle 81, a blade member 82 mounted on an end of the main handle 81 and an auxiliary handle 83 with an end thereof mounted on the main handle 81 adjacent to the blade member 82. The auxiliary handle 83 is spread from the main handle 81 so as to facilitate the user in operating the shovel by holding the main handle 81 and the auxiliary handle 83.

In shoveling operation, the hand holding the main handle 81 is lower than the hand holding the auxiliary handle 83 when moving the shovel to pick objects up on the blade member 82. The user has to tip the blade member 82 to throw the objects off. In the throwing operation, the user has to move the hand holding the main handle 81 upwards and move the hand holding the auxiliary handle 83 downwards to turn the blade member in an inverted position. That is not an easy operation, especially when heavy objects are collected on the blade member 82. Users must use great power to operate the aforesaid shovel and may incur musculoskeletal injury when using the shovel in a heavy duty application.

SUMMARY OF THE INVENTION

The primary objective of the present invention is to provide a shovel, on which a pivot base is provided on the main handle adjacent to the blade member. An auxiliary handle is provided to the pivot base to facilitate user operation of the shovel by gripping the main handle and the auxiliary handle. To tip the blade member, only the main handle has to be rotated to throw the objects collected on the blade member off.

The secondary objective of the present invention is to provide a shovel with a main handle having a first grip and an auxiliary handle having a second grip. An angle is formed between the first grip and the second grip to facilitate the user in holding the shovel with both hands.

DETAILED DESCRIPTION OF THE INVENTION

Figure 1:
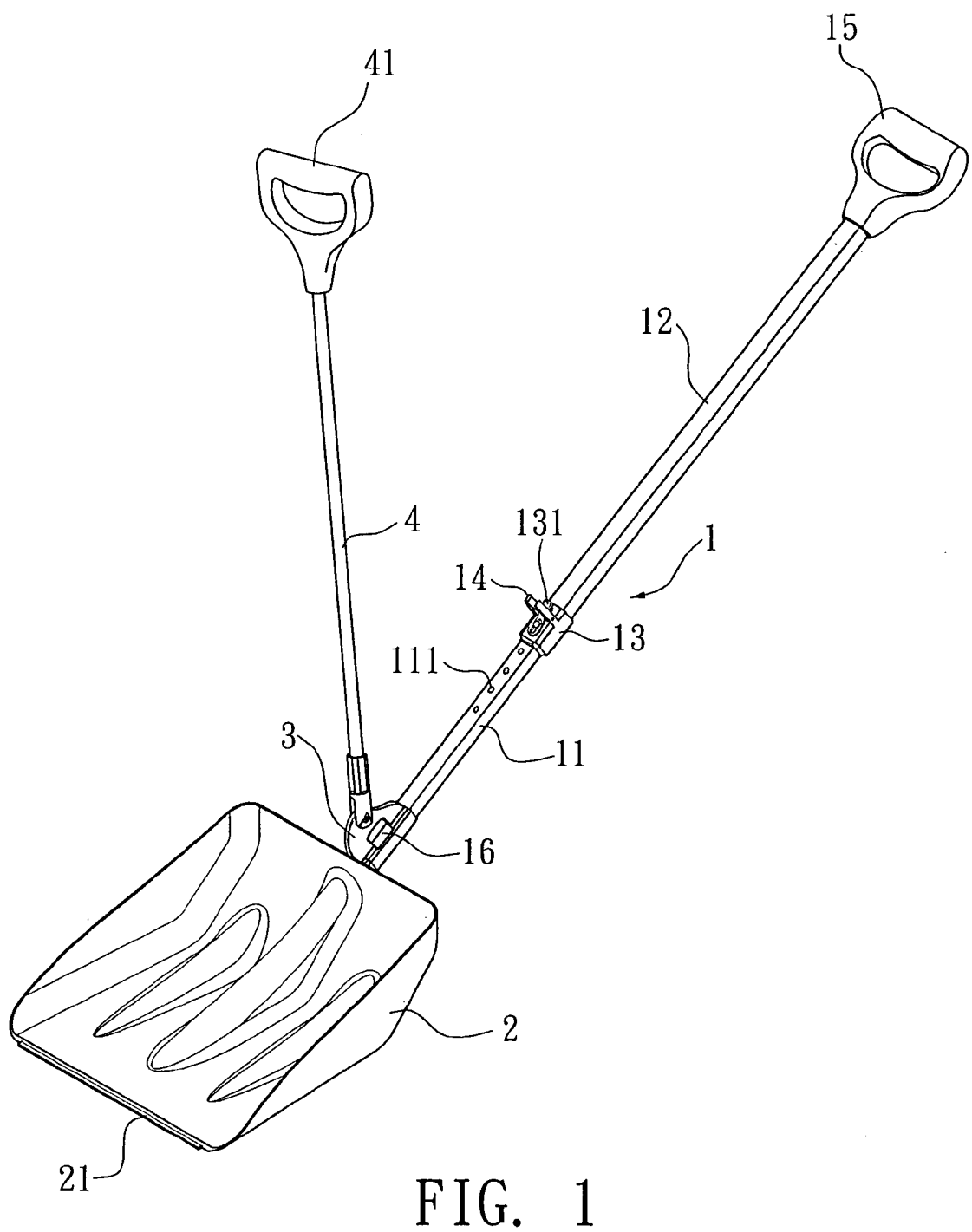
FIG. 1 is a perspective view of a preferred embodiment of the present invention.
Figure 2:
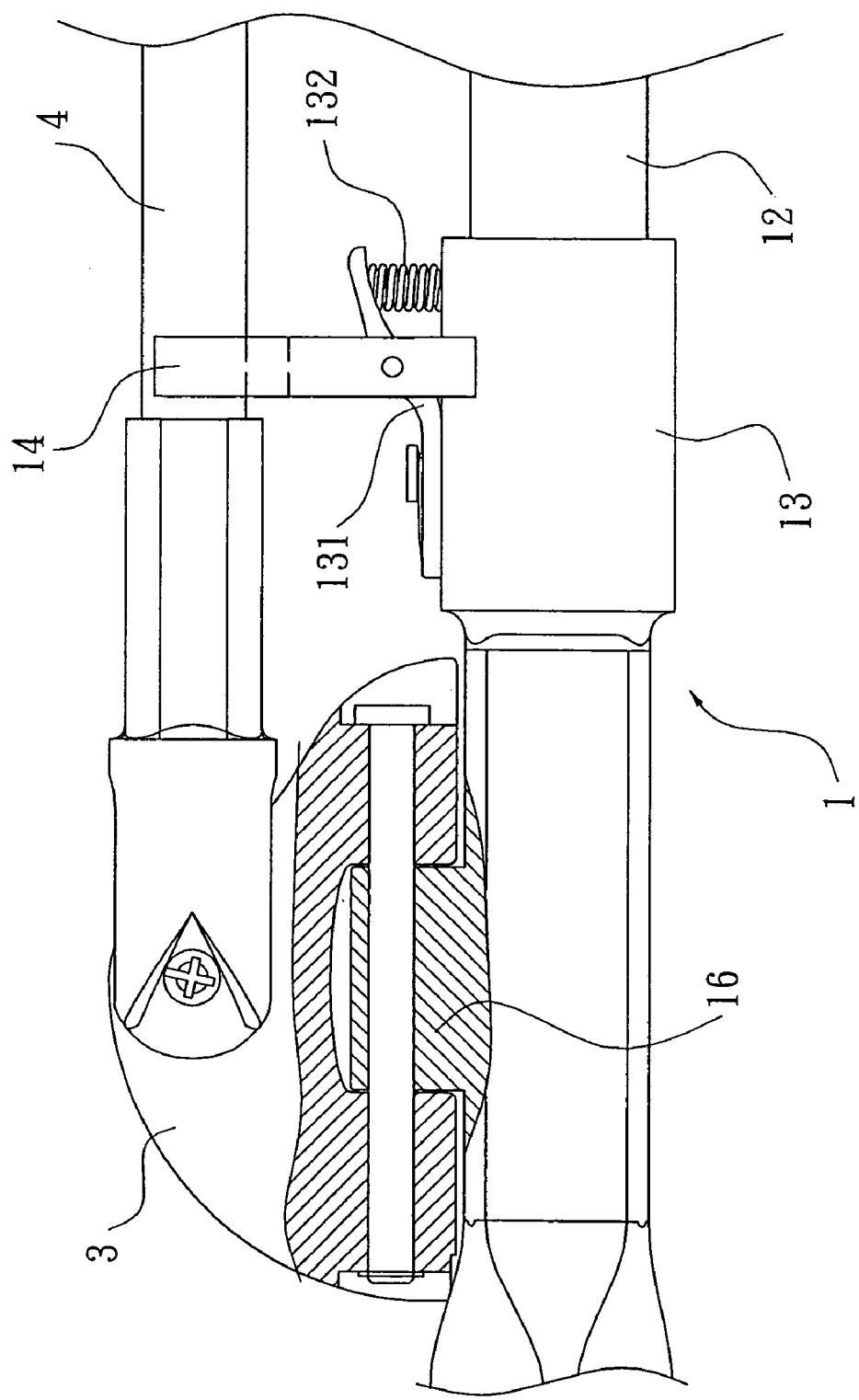
FIG. 2 is a sectional view of the preferred embodiment of the present invention, showing the main handle, the auxiliary handle and the pivot base.
Figure 3:
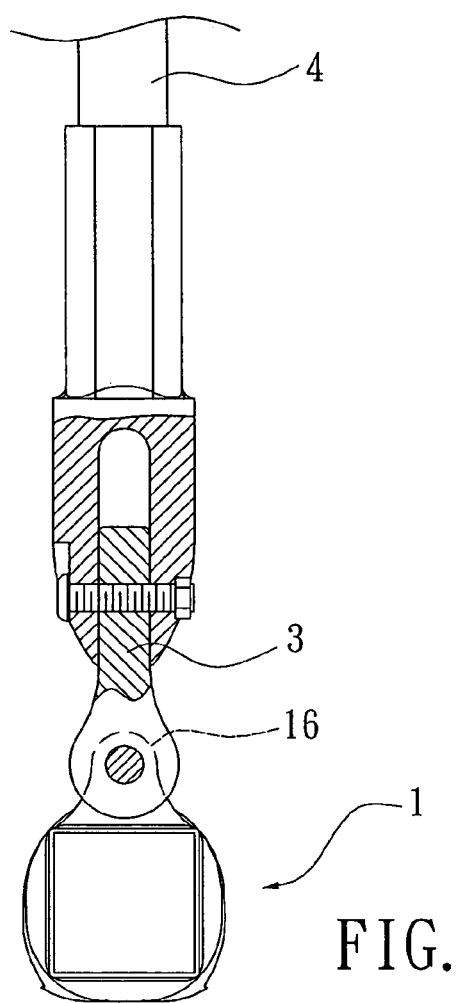
FIG. 3 is another sectional view of the main handle, the auxiliary handle and the pivot base.

As is shown in FIGS. 1–4, a shovel of the present invention includes a main handle 1 having an inner tube 11 and an outer tube 12 fitted one into the other. An end of the outer tube 12, where the inner tube 11 is inserted into the outer tube 12, is provided with a base 13 and the other end of the outer tube 12 is provided with a first handle 15. A lock device 131 is pivotally mounted on the base 13 and a spring 132 is mounted between the lock device 131 and the base 13 to outwardly bias a proximal end of the lock device 131. A distal end of the lock device 131 is received in the outer tube 12. The inner tube 11 has a plurality of holes 111 formed thereon in a linear arrangement and the distal end of the lock device 131 is inserted into one of the holes 111 of the inner tube 11 to secure the inner tube 11 and the outer tube 12. The length of the main handle 1 is adjusted by moving the inner tube 11 or the outer tube 12 and inserting the distal end of the lock device 131 into one of various holes 111.

A blade member 2 is mounted at an end of the main handle 11. More precisely, the blade member 2 is mounted at an end of the inner tube 11 distal to the outer tube 12. The blade member 2 is provided with a reinforced plate 21, which is made of a metal material, at a front end thereof.

A pivot base 3 is provided on the inner tube 11 of the main handle 1 adjacent to blade member 2. The inner tube 11 has a protrusion 16 on which the pivot base 3 is pivoted. The main handle 1 is rotated relative to the pivot base 3 to tip the blade member 2.

Figure 4:
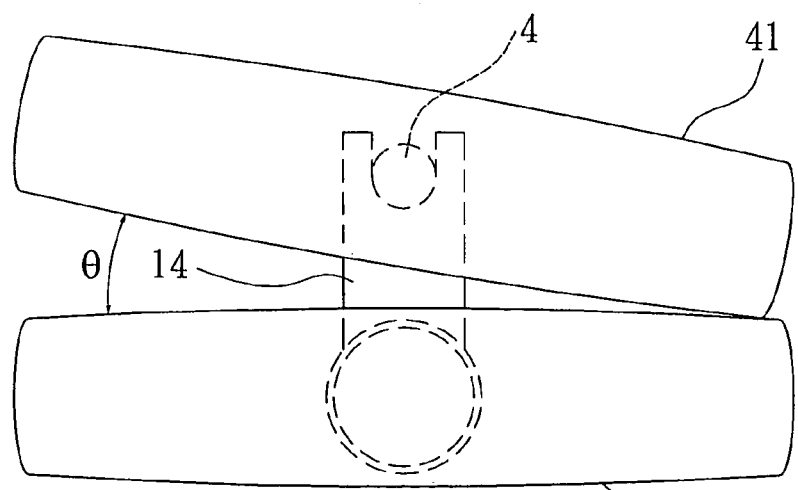
FIG. 4 is a perspective view of the first preferred embodiment of the present invention, showing the angle between the first grip and the second grip.

An auxiliary handle 4 has an end pivotally coupled to the pivot base 3 so that the auxiliary handle 4 may be rotated relative to the pivot base 3. The auxiliary handle 4 is spread from the main handle 1 at a predetermined angle. The base 13 of the main handle 1 is provided with a clip 14 to secure the auxiliary handle 4. At a proximal end of the auxiliary handle 4, a second grip 41 is mounted thereto. The second grip 41 is not parallel to the first grip 15, which means, there is an angle θ formed between the first grip 15 and the second grip 41, as shown in FIG. 4. This provides the user with a comfortable way to hold the first grip 15 and the second grip 41 in both hands.

Figure 5:
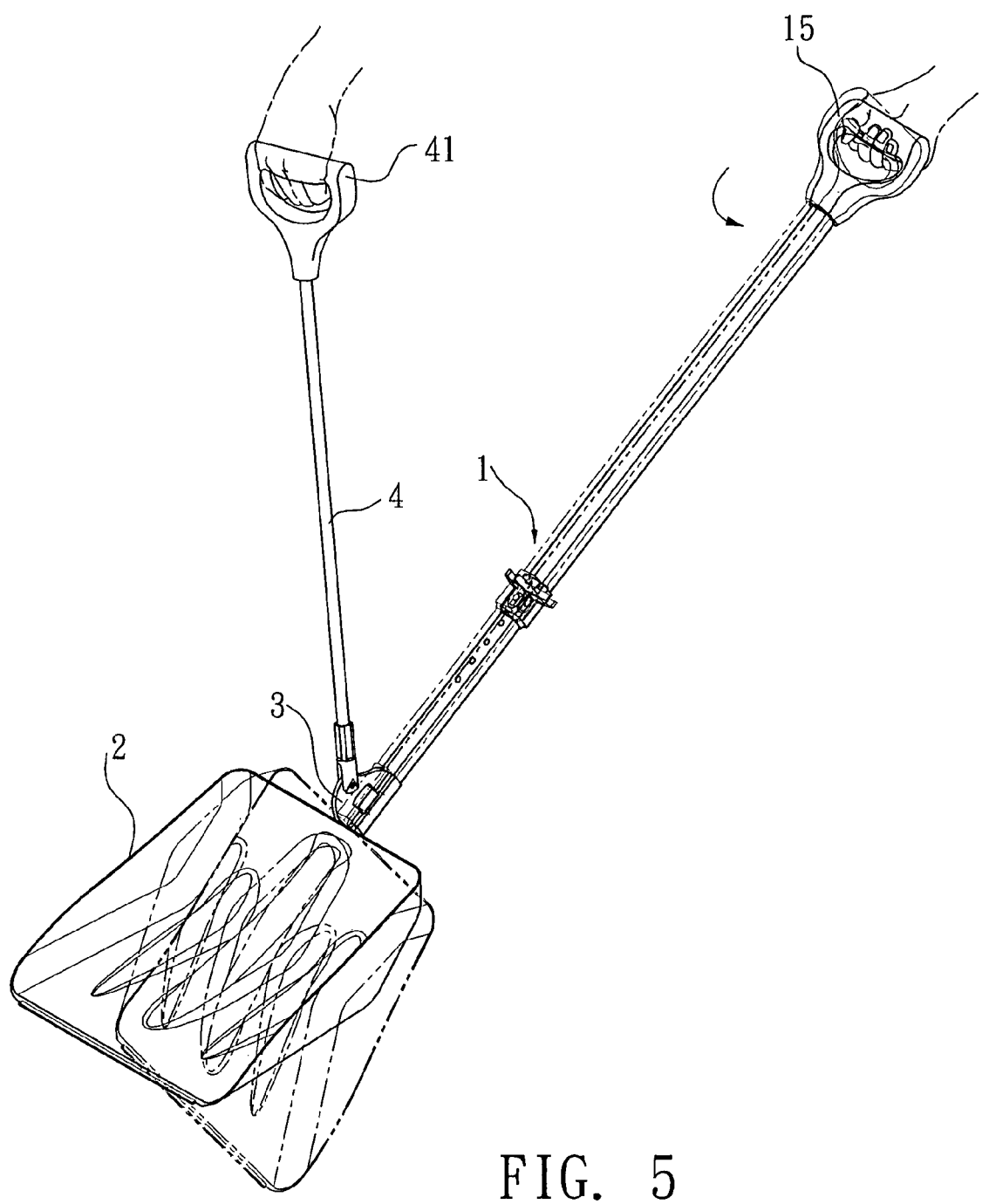
FIG. 5 is a perspective view of the preferred embodiment of the present invention showing the shovel in operation.
Figure 6:
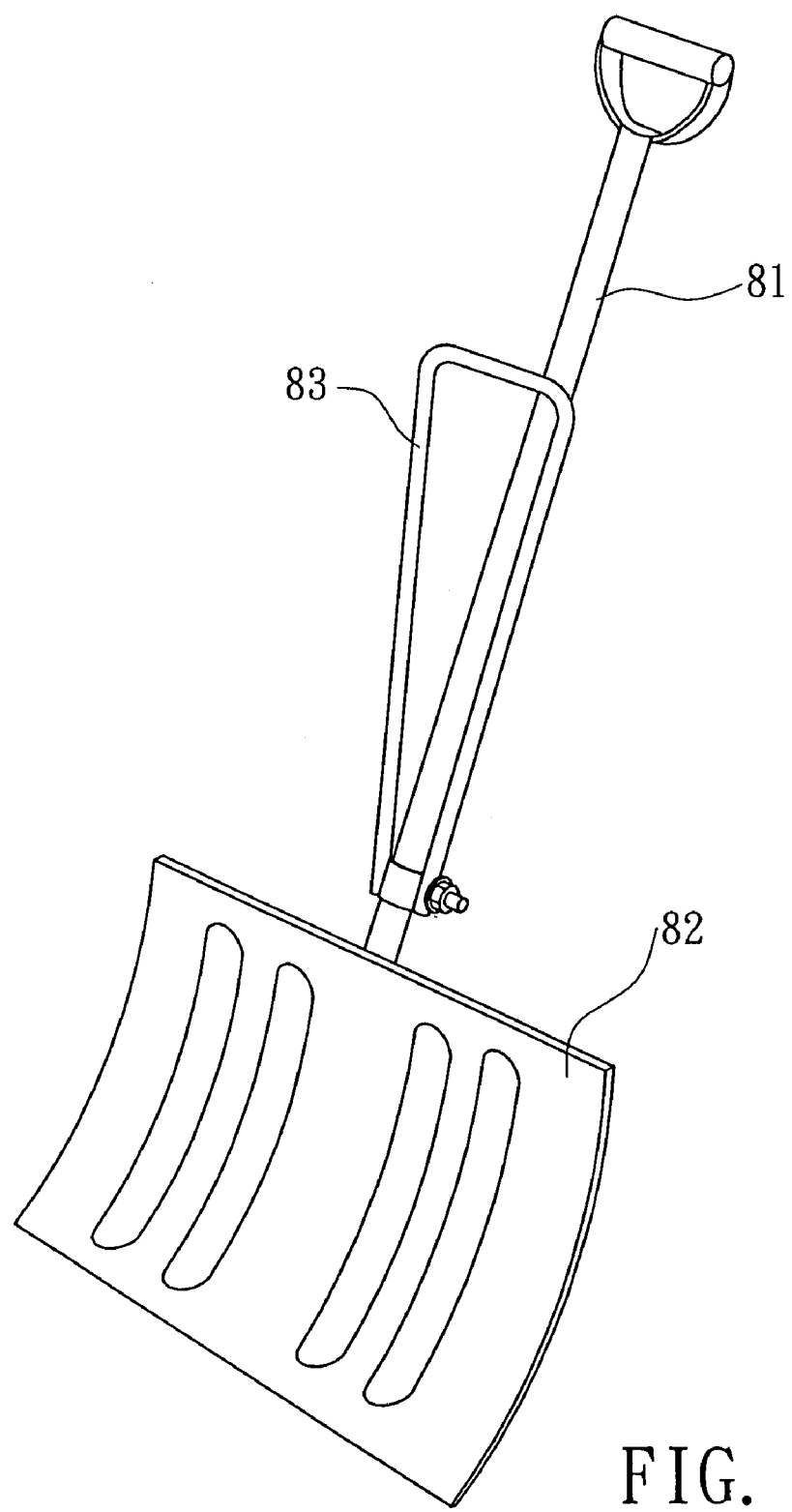
FIG. 6 is a perspective view of the conventional shovel.

As shown in FIG. 5, a user grips the first grip 15 of the main handle 1 by one hand, such as the right hand, and grips the second grip 41 of the auxiliary handle 4 by the other hand, such as the left hand, to operate the shovel of the present invention. Because the auxiliary handle 4 is pivoted on the pivot base 3, the user can move the auxiliary handle 4 as he/she wants to find the best posture for operation of the shovel of the present invention. The angle θ formed between the first grip 15 and the second grip 41 of the shovel of the present invention that allows the user to avoid twisting his/her hands for gripping. The design of the shovel of the present invention ergonomically provides the user a comfortable state in which to operate the shovel regardless of his/her body size.

Because the pivot base 3 is pivoted on the main handle 1 and the auxiliary handle 4 is pivoted on the pivot base 3, the main handle 1 can be rotated independently relative to the pivot base 3. While tipping the objects collected on the blade 2, the user need only to pronate the hand gripping the first grip 15 of the main handle 1 to rotate the main handle 1 independently relative to the pivot base 3, such that the blade member 2 is tipped as shown by the dotted lines in FIG. 5. The operation is performed with only one hand and provides the user with an easier way to throw the shoveled objects off.

The main handle 1 can be adjusted in its length by extracting and retracting the inner tube 11 from the outer tube 12 per the requirement of the user.

To store the shovel of the present invention, the auxiliary handle 4 is secured by the clip 14. The size of the shovel is reduced, thereby providing convenient storage.

In conclusion, the present invention provides an independently rotatable main handle 1 for throwing shoveled objects off by rotating the main handle 1 as opposed to by turning both the main handle 1 and the auxiliary handle 4 upside-down. The present invention provides an easier way to perform the throwing operation. Additionally, the retractable main handle 1 and the movable auxiliary handle 4 facilitates the operation of the shovel of the present invention.

What is claimed is:

1. A shovel, comprising:

a main handle having an inner tube and an outer tube, the inner tube being longitudinally displaceable in the outer tube, a base provided at a distal end of the outer tube, a lock device pivotally coupled to the base, a spring provided between the lock device and the base to outwardly bias a proximal end of the lock device, the inner tube having formed thereon a plurality of holes into one of which the distal end of the lock device is selectively received to adjust a length of the main handle;

a blade member provided at a distal end of the inner tube of the main handle;

a pivot base coupled to the inner tube adjacent to the blade member, the main handle being independently rotatable relative to the pivot base, and an auxiliary handle coupled to the pivot base, the auxiliary handle being independently rotatable relative to the pivot base;

wherein the base of the main handle is provided with a clip adapted to secure the auxiliary handle.

2. The shovel as defined in claim 1, wherein the main handle is provided with a first grip at a proximal end thereof and the auxiliary handle is provided with a second grip at proximal end thereof, wherein an angle is formed between the first grip and the second grip.

* * * * *